US011416561B1

(12) United States Patent
Satish et al.

(10) Patent No.: US 11,416,561 B1
(45) Date of Patent: Aug. 16, 2022

(54) IDENTIFYING EVIDENCE WITHIN AN INFORMATION TECHNOLOGY (IT) OPERATIONS PLATFORM

(71) Applicant: Splunk Inc., San Francisco, CA (US)

(72) Inventors: Sourabh Satish, Fremont, CA (US); David Wayman, San Francisco, CA (US); Kavita Varadarajan, Cupertino, CA (US)

(73) Assignee: Splunk Inc., San Francisco, CA (US)

( * ) Notice: Subject to any disclaimer, the term of this patent is extended or adjusted under 35 U.S.C. 154(b) by 559 days.

(21) Appl. No.: 16/429,044

(22) Filed: Jun. 2, 2019

(51) Int. Cl.
*G06F 16/906* (2019.01)
*H04L 9/40* (2022.01)
*G06F 16/907* (2019.01)
*G06F 16/9038* (2019.01)
*G06F 16/11* (2019.01)
*G06F 3/0482* (2013.01)

(52) U.S. Cl.
CPC .......... *G06F 16/906* (2019.01); *G06F 3/0482* (2013.01); *G06F 16/125* (2019.01); *G06F 16/907* (2019.01); *G06F 16/9038* (2019.01); *H04L 63/105* (2013.01); *H04L 63/1416* (2013.01); *H04L 63/1425* (2013.01)

(58) Field of Classification Search
CPC .... G06F 16/906; G06F 16/907; G06F 16/125; G06F 16/9038; G06F 3/0482; H04L 63/105; H04L 63/1416; H04L 63/1425
USPC ....................................................... 707/736
See application file for complete search history.

(56) References Cited

U.S. PATENT DOCUMENTS

| | | | |
|---|---|---|---|
| 8,561,187 B1* | 10/2013 | Hegli ................ | H04L 63/1491 726/22 |
| 9,697,352 B1* | 7/2017 | Armstrong ........... | G06F 21/552 |
| 2007/0136267 A1* | 6/2007 | Hess ................ | G06F 16/24575 |
| 2009/0119640 A1* | 5/2009 | Ramsey ................ | G06F 8/34 717/109 |
| 2014/0095641 A1* | 4/2014 | Consul ................ | G06Q 10/107 709/206 |
| 2016/0224600 A1* | 8/2016 | Munk ................ | G06Q 20/08 |
| 2016/0366036 A1* | 12/2016 | Gupta ................ | H04L 43/04 |
| 2018/0367568 A1* | 12/2018 | Martinez ........... | H04L 63/0272 |

* cited by examiner

*Primary Examiner* — Hosain T Alam
*Assistant Examiner* — Robert F May
(74) *Attorney, Agent, or Firm* — Nicholson De Vos Webster & Elliott LLP

(57) ABSTRACT

Techniques are described for enabling analysts and other users of an IT operations platform to identify certain data objects managed by the platform (for example, events, files, notes, actions results, etc.) as "evidence" when such data objects are believed to be of particular significance to an investigation or other matter. For example, an event generated based on data ingested from an anti-virus service and representing a security-related incident might include artifacts indicating an asset identifier, a hash value of a suspected malicious file, a file path on the infected endpoint, and so forth. An analyst can use various interfaces and interface elements of an IT operations platform to indicate which of such events and/or artifacts, if any, represent evidence in the context of the investigation that the analyst is conducting. In response, the IT operations platform can perform various automated actions.

27 Claims, 10 Drawing Sheets

PLAYBOOKS MANAGEMENT INTERFACE 200

IT Operations Platform

Playbooks | Custom Lists

PLAYBOOKS LIST 202

204 — + PLAYBOOK

| Name | Label | Repo | Category | Status |
|---|---|---|---|---|
| Playbook 1 \| Successful Executions: 10 \| Failed Executions 2 \| Last Updated: Jan. 10, 2019<br>This playbook can be used to remediate virus-related incidents at endpoint devices. | events | community | IT ops | active |
| Playbook 2 \| Successful Executions: 2 \| Failed Executions 0 \| Last Updated: Dec. 30, 2018<br>This playbook can be used to geo-locate IP addresses. | events | community | Security | inactive |
| Playbook 3 \| Successful Executions: 50 \| Failed Executions 5 \| Last Updated: Nov. 10, 2018<br>This playbook can be used to quarantine endpoint devices. | events | community | Sample | inactive |
| Playbook 4 \| Successful Executions: 20 \| Failed Executions 0 \| Last Updated: Aug. 8, 2018<br>This playbook can be used to remediate virus-related incidents at endpoint devices. | | private | Sample | active |
| Playbook 5 \| Successful Executions: 0 \| Failed Executions 0 \| Last Updated: Jan. 20, 2019<br>This playbook can be used to restart servers experiencing issues. | campaign | community | | inactive |

< 1 2 3 4 5 >  Show 5

*FIG. 2*

IDENTIFYING EVIDENCE WITHIN AN INFORMATION TECHNOLOGY (IT) OPERATIONS PLATFORM

RELATED APPLICATIONS

Any and all applications for which a foreign or domestic priority claim is identified in the Application Data Sheet as filed with the present application are incorporated by reference under 37 CFR 1.57 and made a part of this specification.

FIELD

At least one embodiment of the present disclosure pertains to computing environment security, operational administration, and automation and, in particular, to identification of evidence within an information technology (IT) operations platform based on data related to incidents within a computing environment.

BACKGROUND

An increasing number of security threats and operational issues exist in modern IT environments. These threats and operational issues include, for example, viruses and malware that attack various types of computing devices, sophisticated cyberattacks that attempt to gather data and other information from cloud- or server-based infrastructures, software bugs and hardware failures associated with IT components, among a wide range of other events that can disrupt IT operations. Furthermore, a typical IT infrastructure managed by a business or other entity includes many different types of computing devices, applications, and services that are used to support operations, such as data storage, networking, web sites and application services, and the like. To protect complex IT infrastructures, system administrators typically employ a wide array of devices and applications such as, for example, various antivirus, encryption, firewall, and other IT operations applications.

BRIEF DESCRIPTION OF DRAWINGS

Various embodiments in accordance with the present disclosure will be described with reference to the drawings, in which:

FIG. 2 illustrates an example interface used to manage digital playbooks associated with an IT operations platform according to some embodiments.

DETAILED DESCRIPTION

Figure 1:
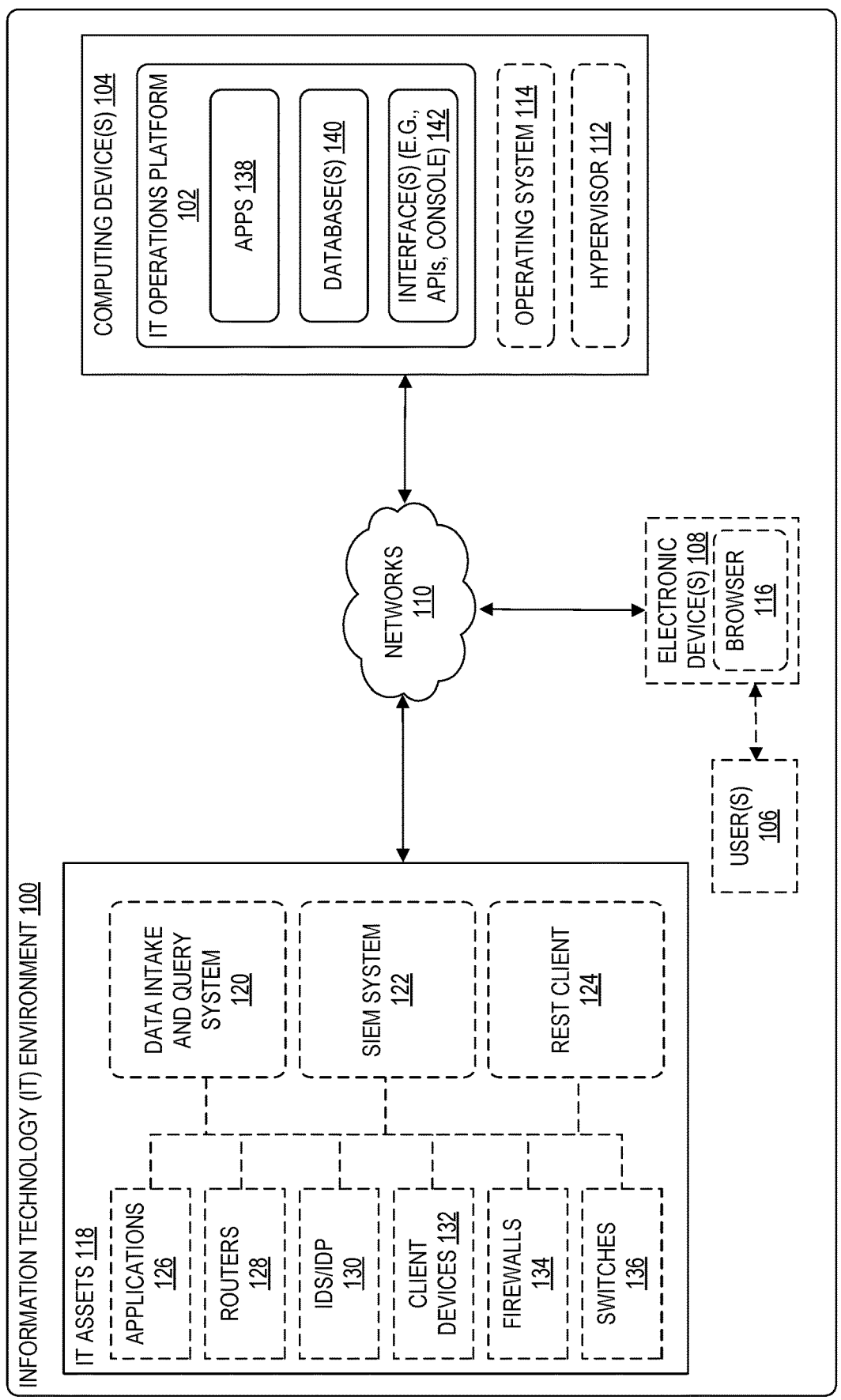
FIG. 1 is a block diagram illustrating an example networked computing environment including an information technology (IT) operations platform according to some embodiments.

Embodiments are described herein according to the following outline:
 1.0. General Overview
 2.0. Information Technology (IT) Operations Platform Overview
   2.1. Data Intake
   2.2. Actions
   2.3. Apps
   2.4. Assets
   2.5. Playbooks
     2.5.1. Playbook Management
     2.5.2. Playbook Creation and Configuration
     2.5.3. Playbook Execution
   2.6 Workbooks
 3.0. Functional Overview
   3.1. Evidence Overview
   3.2. Identifying Data Objects as Evidence
   3.3. Automated Evidence Operations
 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. To reduce the size of the potentially vast amount of machine data that may be generated, many of these tools typically pre-process the data based on anticipated data analysis needs. For example, pre-specified data items may be extracted from the machine data and stored in a database to facilitate efficient retrieval and analysis of those data items at search time. However, the rest of the machine data typically is not saved and is instead discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although some of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, and so forth.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as by Internet Protocol (IP) address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

2.0. Information Technology (IT) Operations Platform Overview

As indicated above, the management of modern IT environments often involves managing a large number of devices and software operating within such environments. A system administrator of even a modestly-sized IT environment, for example, might be responsible for managing numerous servers, endpoint devices, firewalls, and various types of software products and services running on top of those devices. Systems such as the SPLUNK® ENTERPRISE system, as well as other various SIEM, security, and IT applications, provide ways to organize, analyze, diagnose, and provide intelligence related to these components of users' IT environments.

The management of IT environments often further includes responding to a wide variety of incidents that may occur over time and which may be indicated or derived from analysis of data generated by IT environment components, as described above. Such incidents can include security-related incidents (for example, viruses, network issues, etc.), IT component-related incidents (for example, hardware failures, software bugs, etc.), and any other events that potentially impact operation of an IT environment. These incidents can be flagged, and information related to the incidents may be provided to an administrator or other user to be analyzed for a possible solution. Once a possible solution is identified, the process for remediating such incidents can involve interacting with one or several components within the IT environment. In response to identifying a security-related issue involving an endpoint device, for example, a system administrator might use security software to quarantine the endpoint device, interact with a firewall to update network settings, among any number of other possible operations.

The ability to readily respond to incidents in an IT environment can be aided by using an IT operations platform (sometimes also referred to as an orchestration, automation, and response (OAR) platform), such as the SPLUNK® PHANTOM® system. An IT operations platform generally enables users to connect disparate collections of security and IT applications in users' IT environments and to automate tasks typically performed manually by system administrators and other users in response to identification of various types of IT-related incidents.

FIG. 1 is a block diagram illustrating an example networked computing environment including an IT operations platform according to some embodiments. In some embodiments, an IT operations platform 102 operates in a networked IT environment 100 and comprises one or more software components executed by one or more electronic computing devices 104. The computing devices 104 generally can be hosted at an on-premises or cloud-based computing environment, or a combination thereof, such that the IT operations platform 102 can be accessed by users 106 and used to interact with components of an organization's computing infrastructure. Users 106 using one or more electronic device(s) 108 (which may be part of or separate from the IT environment 100) can interact with the IT operations platform 102 via one or more networks 110. Networks 110 broadly represent one or more local area networks (LANs), wide area networks (WANs), cellular networks (e.g., Long-Term Evolution (LTE), High Speed Packet Access (HSPA), 3G, and other cellular technologies), and networks using any of wired, wireless, terrestrial microwave, or satellite links, and may include the public internet. Users 106 may interact with an IT operations platform 102 via one or more interfaces 142, such as through use of application programming interface (API) calls, via a console implemented as a website or application, etc.

In some embodiments, some or all the computing devices 104 and systems upon which an IT OPERATIONS platform 102 operates may rely upon virtualization techniques. These virtualization technologies may include virtual machines (VMs) using a guest operating system 114 that operates using a hypervisor 112, where the hypervisor 112 itself may or may not further operate on top of an underlying host operating system. The virtualization technologies may additionally or alternatively include use of containers that may or may not operate in a VM, software that executes on computing device 104 hardware without an underlying hypervisor or other virtualization technology, or any other combination thereof.

In some embodiments, an IT operations platform 102 can be deployed as a virtual appliance at one or more computing devices 104 managed by an organization using the IT operations platform 102. A virtual appliance, for example, may comprise a VM image file that is pre-configured to run on a hypervisor 112 or directly on the hardware of a computing device 104 and that comprises a pre-configured operating system 114 upon which the IT operations platform 102 executes. In other embodiments, the IT operations platform 102 can be provided and installed using other types of standalone software installation packages or software package management systems. Depending on the implementation and user preference, an IT operations platform 102 optionally can be configured on a standalone server or in a clustered configuration across multiple separate computing devices 104. In other embodiments, an IT operations platform 102 can be hosted on computing devices 104 managed by an entity that is separate from the users 106 and provided to users 106 as a service (for example, as a service of a cloud-based service provider).

In some embodiments, a user initially configures an IT operations platform 102 using a virtual console screen or other interface of a VM hosting the IT operations platform 102, for example, to create and configure root and user accounts, configure network settings, and perform other possible configurations. Once a virtual appliance hosting an IT operations platform 102 is associated with an IP address and is reachable via a network 110, users 106 can access various interfaces of the IT operations platform 102, including a web-based console. For example, users 106 can use a web browser 116 or other application to navigate to the IP address or hostname associated with the IT operations platform 102 to access console interfaces used to interact with various aspects of the platform.

An IT environment 100 further includes any number of IT assets 118, for example, as part of a corporate network or other environment with which one or more users 106 are associated. In an embodiment, each of these IT assets 118 can serve as sources of incident data to an IT operations platform 102, an asset upon which actions can be performed by the IT operations platform 102, or both. The IT assets 118 can include various types of computing devices, software applications, and services including, but not limited to, a data intake and query system 120 (which itself can ingest and process machine data generated by other IT assets 118), a SIEM system 122, a REST client 124 that obtains and/or generates incident data based on the activity of other IT assets 118, software applications 126 (including operating systems, databases, web servers, etc.), routers 128, intrusion detection systems and intrusion prevention systems (IDS/IDP) 130, client devices 132 (for example, servers, desktop computers, laptops, tablets, etc.), firewalls 134, and switches 136. These IT assets 118 may execute upon any number separate computing device(s) and systems within the IT environment 100.

During operation, a data intake and query system 120, SIEM system 122, REST client 124, or other system components or combinations thereof, obtain operational, performance, and security data from other IT assets 118, analyze the data, and optionally identify potential IT-related incidents and send data indicating such incidents to the IT operations platform 102. Once a data intake and query system 120 identifies a possible security threat or other IT-related incident based on data ingested by the data intake and query system 120, for example, data representing the incident can be sent to the IT operations platform 102 (for example, formatted as JavaScript Object Notation (JSON) data or using other possible data formats). As described in more detail herein, the IT operations platform 102 obtains and analyzes such incident data to determine possible actions to perform to remediate or otherwise respond to such incidents. These actions can include default actions that can be initiated and performed within the IT environment 100 without interaction from an administrator or other user and can further include providing suggested actions to one or more users 106. Once the suggested actions are determined, for example, these actions can be presented in an administration console or other interface accessible to users 106. Based on the suggested actions, a user 106 can select one or more particular actions to be performed and the IT operations platform 102 can carry out the selected actions within the IT environment 100.

In some embodiments, to execute actions responsive to identified incidents, an IT operations platform 102 uses a unified security language to perform actions across a variety of hardware and software products, applications, and services. To execute a command specified using the unified language, for example, the IT operations platform 102 uses one or more apps 138 to translate the commands into the one or more processes or languages necessary to implement the action at one or more particular IT assets 118. For example, a user 106 might provide input requesting the IT operations platform 102 to remove an identified malicious process from multiple computing systems in the IT environment 100, where two or more of the computing systems are associated with different software configurations (for example, different operation systems or operating system versions). Accordingly, the IT operations platform 102 translates the command from the administrator into the necessary processes to remove each instance of the malicious process on the varying computing systems.

In some embodiments, an IT operations platform 102 enables users to automate actions or series of actions by creating digital "playbooks" that can be executed by the IT operations platform 102. At a high level, a playbook is a customizable computer program that can be executed by an IT operations platform 102 to automate a wide variety of possible operations related to an IT environment 100. These operations—such as quarantining devices, modifying firewall settings, restarting servers, and so forth—are typically performed by various security products by abstracting product capabilities using an integrated "app model." Additional details related to operation of the IT operations platform 102 and use of digital playbooks are provided elsewhere herein.

2.1. Data Intake

The operation of an IT operations platform 102 generally begins with the ingestion of data related to various types of incidents involving one or more IT assets 118 of an IT environment 100. In one embodiment, users 106 configure an IT operations platform 102 to obtain, or "ingest," data from one or more defined data sources, where such data sources can be any type of computing device, application, or service that supplies information that users may want to store or act upon. As indicated above, examples of data sources include, but are not limited to, a data intake and query system 120 such as the SPLUNK® ENTERPRISE system, a SIEM system 122, a REST client 124, applications 126, routers 128, intrusion detection systems (IDS)/intrusion prevention systems (IDP) systems 130, client devices 132, firewalls 134, switches 136, or any other source of data identifying potential incidents in an IT environment. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some embodiments, data ingested from configured data sources is represented in the IT operations platform 102 by "containers." A container is a structured representation of an incident or other type of data ingested from a data source and that can be used throughout the IT operations platform 102. In some embodiments, an IT operations platform 102 can be configured to create and recognize different types of containers depending on the corresponding type of data ingested, such as "incident containers" for IT-related incidents, or "security event containers" for security-related incidents, and so forth. A container can further include any number of "artifacts," where each artifact represents an item of data associated with the container. For example, a container used to represent data ingested from an anti-virus service and representing security-related incidents may include artifacts indicating a name of the virus, an associated hash value, a file path on the infected endpoint, and so forth.

In an embodiment, the IT operations platform 102 stores various data related to its operation, including container data created based on data ingested from IT assets, playbook data, user account settings, configuration data, and so forth, in one or more database(s) 140. These database(s) 140 may operate on a same computer system as the IT operations platform 102 or at one or more separate database instances.

In some embodiments, an IT operations platform 102 enables users to configure an instance of the platform to support multi-tenancy. A multi-tenant configuration, for example, can enable users of a security team to manage assets associated with multiple independent third-party organizations for which the security team is responsible while maintaining data separation and security among the configured assets and data of each organization. Users and user teams can thus use this feature to perform incident response for multiple third-party organizations on one instance of the IT operations platform 102 and using only a single login and permissions configuration.

In an embodiment, users can create custom data sources using a REST client 124. For example, a REST client can be configured to monitor one or more IT assets 118 for incidents and use APIs 142 provided by the IT operations platform 102 to create, update, and remove data from an IT operations platform 102 corresponding to the incidents.

2.2. Actions

In an embodiment, the IT operations platform 102 defines many different types of "actions," which are high-level, vendor- and product-agnostic primitives that can be used throughout the IT operations platform 102. At a high level, actions represent simple and user-friendly verbs that are used to execute actions in playbooks and manually through other user interfaces of the IT operations platform 102. In general, a same action defined by the IT operations platform 102 can be carried out on assets associated with different vendors and/or configurations, where the translation of an action for use at a particular asset is performed by various "apps" of the platform, as described below. Examples of actions that may be defined by an IT operations platform 102 include, for example, "get process dump," "block IP address," "suspend VM," "terminate process," etc.

2.3. Apps

In an embodiment, an IT operations platform 102 enables connectivity with various IT assets 118, including those from various third-party IT and security technologies, and the ability to execute actions at those assets via "apps" 138. In general, an app 138 represents program code that provides an abstraction layer (e.g., via a library, API, or other interface) to one or more of hundreds of possible IT and security-related products and services, and which exposes lists of actions that are supported by those products and services. Each app 138 may also define which types of assets that the app can operate on.

As one example, an IT operations platform 102 may be configured with an app 138 that enables the platform to communicate with a VM product provided by a third-party vendor. In this example, the app for the VM product enables the platform 102 to take actions relative to VM instances within a user's IT environment, including starting and stopping the VMs, taking VM snapshots, analyzing snapshots, and so forth. In order for the app to communicate with individual instances, the app 138 can be configured with login credentials, hostname or IP address, and so forth, for each instance with which communication is desired. Other apps 138 may be available for VM products from other third-party vendors, where those apps are configured to translate some or all of the same actions that are available with respect to the first type of VM product. In general, apps 138 can enable interaction with virtually any type of IT asset 118 in an IT environment and can be added and updated over time to support new types of assets.

2.4. Assets

In an embodiment, IT assets 118 are instances of physical or virtual components within an organization with which an IT operations platform 102 communicates (for example, via apps as described above). Examples of IT assets 118 include, but are not limited to, servers, endpoint devices, routers, and firewalls. In the context of an IT operations platform 102, an IT asset 118 is represented by data identifying the asset, including information used to communicate with the device or service (for example, an IP address, automation service account, username, password, and so forth). In an embodiment, one or more IT assets 118 can be configured as a source of incident information that is ingested by an IT operations platform 102. The types of IT assets 118 that can be configured in the IT operations platform 102 may be determined in some cases based on what apps 138 are installed, as described above. In some embodiments, automated actions can be configured with respect to various IT assets 118 using playbooks, described in more detail elsewhere herein.

2.5. Playbooks

In some embodiments, the operation of an IT operations platform 102 includes the ability to execute customizable "playbooks." At a high level, a playbook comprises computer program code and possibly other data that can be executed by an IT operations platform 102 to carry out an automated set of actions. In one embodiment, a playbook is comprised of one or more functions or codeblocks, where each codeblock contains program code that performs defined functionality when the codeblock is encountered during execution of the playbook of which it is a part. For example, a first codeblock may implement an action that is performed relative to one or more IT assets 118, another codeblock might filter data generated by the first codeblock in some manner, and so forth. A playbook is further associated with a control flow that defines an order in which the codeblocks of the playbook are executed, where a control flow may vary at each execution depending on particular input conditions.

The IT operations platform 102 described herein provides graphical user interfaces (GUIs) including a visual playbook editor that allows users to visually create and modify playbooks. Using a visual playbook editor GUI, for example, users can codify a playbook by creating and manipulating a displayed graph including nodes and edges, where each of the nodes in the graph represents a codeblock that performs one or more defined operations during execution of the playbook, and where the edges represent the control flow among the playbook's codeblocks. In this manner, users can craft playbooks that perform complex sequences of operations without having to write some or any of the underlying code. The visual playbook editor interfaces further enable users to supplement or modify the automatically generated code by editing the code associated with a visually-designed playbook, as desired.

2.2.1. Playbooks Management

In an embodiment, an IT operations platform 102 provides one or more playbook management interfaces that enable users to locate and organize playbooks associated with a user's account. A playbook management interface, for example, can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is kept, a status of the playbook, and so forth.

FIG. 2 illustrates an example playbook management interface according to some embodiments. As shown in FIG. 2, the playbook management interface 200 includes a playbook list 202. As indicated above, a playbook list 202 includes several columns indicating information about each playbook including, for example, a name of the playbook, one or more labels associated with each playbook, a repository at which the playbook is kept, a category associated with each playbook, and a status of the playbook. In an embodiment, a user can also use interface elements 204 to sort the list of displayed playbooks, refresh the playbook list, download an exported copy of one or more playbooks, or create a new playbook, among other possible operations. In an embodiment, a user can also provide input selecting a playbook to view in the visual playbook editor so that the user can modify the selected playbook, if desired.

2.5.2 Playbook Creation and Configuration

In an embodiment, users can create a new digital playbook starting from a playbook management interface, as described in reference to FIG. 2, or using another interface provided by the IT operations platform 102. Using the playbook management interface 200, for example, a user can select the "create new playbook" interface element from interface elements 204. Once a user has provided input requesting the creation of a new playbook, the IT operations platform 102 displays a visual playbook editor interface including a graphical canvas on which users can add nodes representing operations to be performed during execution of the playbook, where the operations are implemented by associated source code that can be automatically generated by the visual playbook editor, and connections or edges among the nodes defining an order in which the represented operations are performed upon execution.

Figure 3:
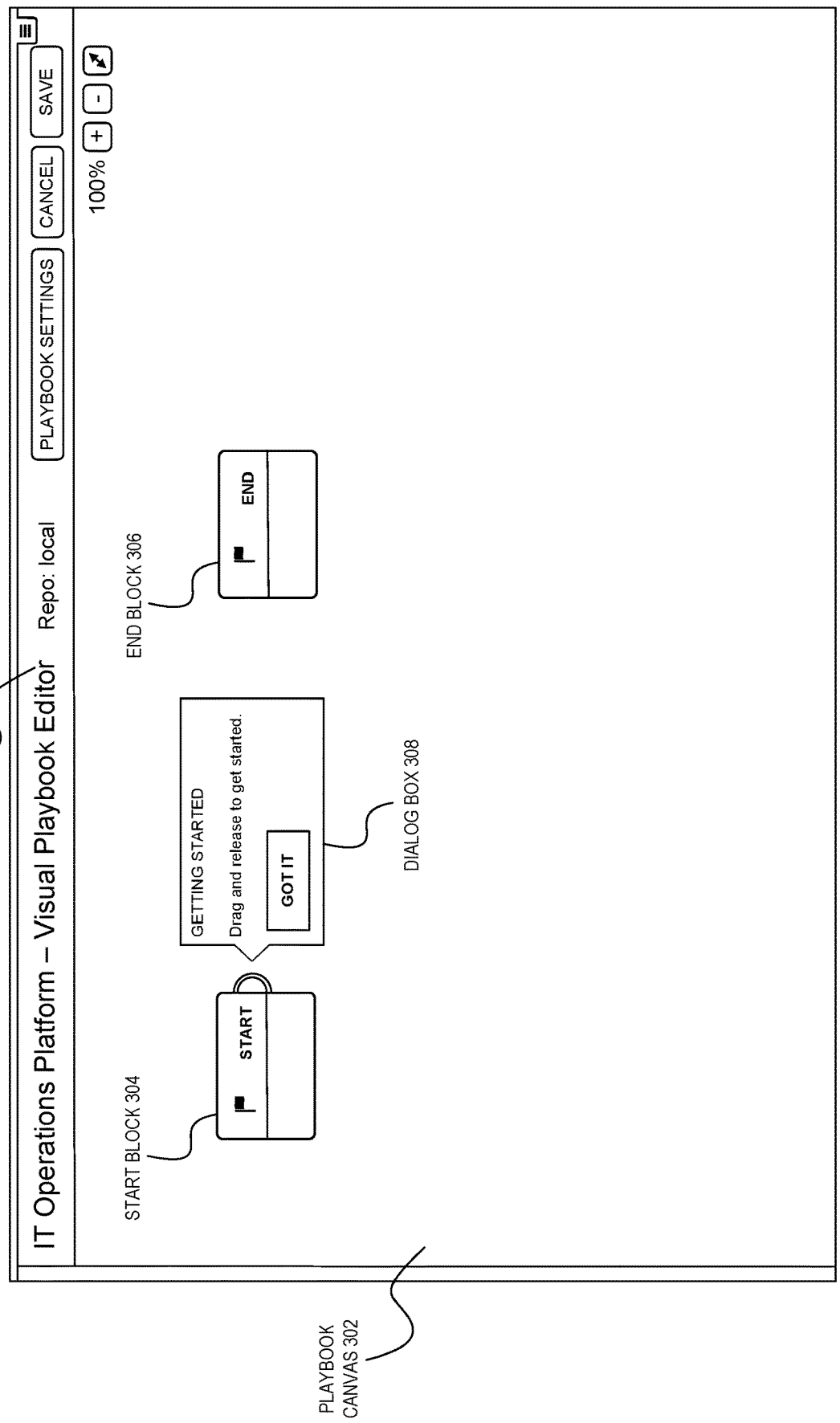
FIG. 3 illustrates an example visual playbook editor interface used to create a digital playbook according to some embodiments.

FIG. 3 illustrates a visual playbook editor canvas that can be used to visually design a playbook. As illustrated in FIG. 3, a visual playbook editor interface 300 includes a playbook canvas 302 initially including two nodes corresponding to a start block 304 and an end block 306, respectively, where those nodes represent a start and end point for execution of the playbook being designed. In the illustrated example, the visual playbook editor interface 300 further displays an example dialog box 308 instructing a user to select the start block 304 and to create an edge or connection originating from the start block 304 to add a new block to the playbook. As described in more detail below, the visual playbook editor interface 300 enables users to add various types of blocks to a playbook including, for example, playbook blocks, decision blocks, filter blocks, action blocks, format blocks, prompt blocks, task blocks, and API blocks.

In an embodiment, one type of block that can be added to a playbook is an action block. Once an action block is added to a playbook, the visual playbook editor interface can guide the user in selecting an action to be performed when the action block is encountered during execution of the playbook. The action block can optionally be further configured using various items of data accessible to the action block including, for example, data stored as part of a container and associated artifacts as well as other output variables generated by other playbook blocks. For example, if a user adds an action block that performs the operation of geolocating an IP address, a user may configure the action block to use an IP address corresponding to a selected artifact of a container that initiated the playbook's execution, or based on an IP address obtained by an upstream block using other processes.

In an embodiment, another type of block that a user can add to a playbook is a prompt block. A prompt block is generally used to add user interaction to a playbook by causing information to be requested from one or more users at a particular point during execution of the playbook. The information requested and provided by a user can be used by other downstream blocks of the playbook. For example, a playbook might include an action block that detects the presence of potentially malicious IP addresses, a serially-connected prompt block that presents information to a user about the detected potentially malicious IP address and requests a yes/no response from the user indicating whether the IP address should be blocked, followed by another serially-connected action block that either blocks the IP address at a firewall or not depending on the input received from a user in response to the prompt block.

In an embodiment, a prompt block is associated with various properties that can be configured by a user using a visual playbook editor including, for example, configurations indicating a prompt approver, a required response time, a message prompt, and a response type. The assignment of a prompt approver indicates an individual user or user role (e.g., administrator, engineer, manager) that is to receive the prompt to be acted upon during execution of the corresponding playbook. A required response time indicates an amount of time that an assigned approver or set of approvers have to complete the prompt, for example, by accessing the prompt and providing any requested information and/or performing actions specified by the prompt. A message prompt is information that is displayed to a user when the user accesses an assigned prompt (for example, a message prompt can be presented as part of a GUI interface element displayed to a user accessing an assigned prompt). A response type indicates a type of acceptable response that can be provided by a user to successfully complete the prompt (for example, ayes/no response, a numerical value response, a text-based response, a response from an enumerated list of options, etc.).

In some embodiments, a user accesses a prompt that has been generated for the user during execution of a playbook via a notification presented in a "mission control" or other type of interface of the IT operations platform 102. In response to a user accessing an assigned prompt (for example, by providing input selecting a notification indicating the existence of the prompt), the IT operations platform 102 causes display of an interface element that includes a message indicating what information is being requested from the user. A user assigned a prompt can either complete the prompt (that is, access the prompt and provide any requested data), delegate the prompt to a different user, or allow the deadline for responding to the prompt to time out. A prompt is successfully completed when either the designated user, or a user to whom the prompt is delegated, completes the prompt. If a prompt is assigned to a group of users, a prompt can be successfully completed when either at least one user of the group completes the prompt, or when all users of the group complete the prompt, depending on how the prompt is configured.

In an embodiment, yet another type of function block that can be added to a playbook is a task block. A task block is generally configured to send a message to a user or group of users to be acknowledged by the users. A task block can be further configured by specifying an approver (that is, a user or user role to whom the task is sent), a response deadline (for example, expressed in minutes from the time at which the task is generated), a message to be displayed to the user(s), among other possible configurations.

In an embodiment, yet another type of block that can be added to playbooks in a visual playbook editor is a decision block. A decision block generally can be used to control program flow associated with the playbook. For example, during execution of a playbook, a decision block can be used to determine whether the execution flow proceeds next to a block A or to a block B (or block C, and so forth) depending on the outcome of one or more logical conditions defined by the decision block. These logical conditions, for example, can be based on comparisons involving artifact data, container properties, date functions, action results, among other possible types of input data. The use of a decision block in a playbook, for example, is conceptually similar to an if-then conditional statement found in high-level programming languages.

In an embodiment, yet another type of block that can be included in a playbook is an API block. An API block can be used, for example, to set various parameters associated with an incident container upon which the playbook is executing or to interact with the IT operations platform 102 in other ways supported by an associated API. For example, an API block can be used to set a severity level associated with an incident container, to indicate that the incident container is resolved, to associate a label with the incident container, add a comment to the container, among other possible operations.

In an embodiment, the creation of a graph representing a playbook includes the creation of connections between function blocks, where the connections are represented by edges that visually connect the nodes of the graph representing the collection of function blocks. These connections among the playbook blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

In an embodiment, users can create connections that link function blocks of a playbook in parallel. For example, a user can create a connection that links the output of a function block A to the input of a function block B and separately to the input of a function block C. In this example, the IT operations platform 102 can execute the operations defined by function blocks B and C in parallel, although the exact ordering of the execution may not be guaranteed. For some playbooks, the execution of two or more function blocks in parallel may provide a performance benefit compared to executing the function blocks serially.

In an embodiment, the visual representation of a playbook in a visual playbook editor, comprising a collection of nodes and edges, can be modified over time. Users can provide input via the visual playbook editor interface, for example, to rearrange the location of and connection between nodes in the graph and the visual playbook editor can route existing connections among the nodes accordingly such that an easily understandable visual representation is provided. In some embodiments, multiple nodes can be selected and moved around the canvas as a group.

2.5.3. Playbook Execution

Once a user has codified a playbook using a visual playbook editor or other interface, the playbook can be saved (for example, in a database 140 and in association with one or more user accounts) and run by the IT operations platform 102. As illustrated in the example playbooks above, a playbook includes a "start" block that is associated with source code that begins execution of the playbook. More particularly, the IT operations platform 102 executes the function represented by the start block for a playbook with container context comprising data about the incident upon which the playbook is executed, where the container context may be derived from input data from one or more configured data sources. A playbook can be executed manually, for example, in response to a user providing input requesting execution of the playbook, or playbooks can be executed automatically in response to the IT operations platform 102 obtaining input events matching certain criteria. In embodiments where the source code associated with a playbook is based on an interpreted programming language (for example, such as the Python programming language), the IT operations platform 102 can execute the source code represented by the playbook using an interpreter and without compiling the source code into compiled code. In other examples, the source code associated with a playbook can first be compiled into byte code or machine code and executed by the IT operations platform 102.

2.6. Workbooks

Some IT operations platforms, such as the SPLUNK® PHANTOM® platform, include the ability for users to create, customize, and use "workbooks." At a high level, a workbook enables users to codify an organization's standard operating procedures (SOPs) and other defined processes for responding to incidents (e.g., security threats, operational issues, etc.) within an IT environment into reusable templates. In some embodiments, a workbook is comprised of one or more user-defined phases (e.g., detection, analysis, containment, eradication, recovery, etc., in the context of a security investigation), where each phase includes one or more user-defined tasks to be performed by assigned analysts or other users. A workbook in this way defines an overall procedure that helps efficiently guide users of an IT operations platform through the process of responding to, documenting, and reporting incidents when they occur. Different workbook templates can be defined for responding to different types of incidents—for example, one workbook template might be created to help analysts investigate and respond to computer security incidents, another workbook template can be created to help analysts recover from and report significant hardware failures, and so forth. In some examples, workbook templates can be created to help analysts carry out various industry-wide SOPs (e.g., the NIST-800-61 standard for responding to computer security incidents).

In some embodiments, each task defined as part of a workbook template can be optionally associated with one or more automated actions or playbooks that can be executed by the IT operations platform 102 to help to carry out the task. For example, if a workbook includes a task of obtaining a particular log file at one or more endpoint devices associated with an incident, that task can be associated with an automated action or playbook for obtaining the relevant log files without additional manual user involvement. A user may specify a set of one or more executable actions, playbooks, or a combination thereof, in association with some or all of a workbook's tasks as part of the workbook template configuration process. In some embodiments, the IT operations platform 102 can additionally or alternatively automatically associate actions and playbooks with particular tasks, for example, by matching tasks to possible actions/playbooks based on an analysis of the text or other attributes associated with phase/task definitions.

In some embodiments, an IT operations platform 102 includes various GUIs that enable users to interact with workbooks. For example, in response to the IT operations platform identifying an occurrence of a particular type of incident, the IT operations platform 102 may instantiate a new workbook based on a previously defined workbook template associated with that type of incident (e.g., if a malware attack is identified, the IT operations platform 102 can create a new workbook based on a computer security incident workbook template). Once a new workbook is created, analysts can use these interfaces to complete assigned tasks and to view the workbook's progress. Users can perform assigned workbook tasks, for example, either by manually performing the tasks or by selecting one or more automated actions or playbooks associated with the task. Icons or other graphical elements representing the automated actions and playbooks associated with the various workbook tasks can be graphically displayed, for example, such that a user can execute associated actions/playbooks simply by selecting a corresponding interface element in a workbook GUI.

In some embodiments, an IT operations platform 102 further optimizes the presentation of executable actions and playbooks displayed in connection with workbook tasks. For example, instead of displaying the actions and playbooks associated with workbook tasks in an arbitrary order, the IT operations platform 102 can monitor and log the efficacy of each action and playbook over time and use such data to determine a prioritized order in which to display the actions/playbooks in a workbook (or determine whether to display particular actions or playbooks at all). For example, when an action associated with a task is executed, the IT operations platform 102 can monitor the action's execution and determine whether the action executed successfully (e.g., if an action is configured to terminate a process running on an endpoint device, the IT operations platform 102 can determine whether the action was actually able to successfully connect to the endpoint device and terminate the process). This information can be collected over time and used, for example, to display actions/playbooks associated with various tasks in an order that reflects how successful each action/playbook historically has been in completing the task so that analysts can be guided to those actions/playbooks most likely to successfully complete a task.

Figure 4:
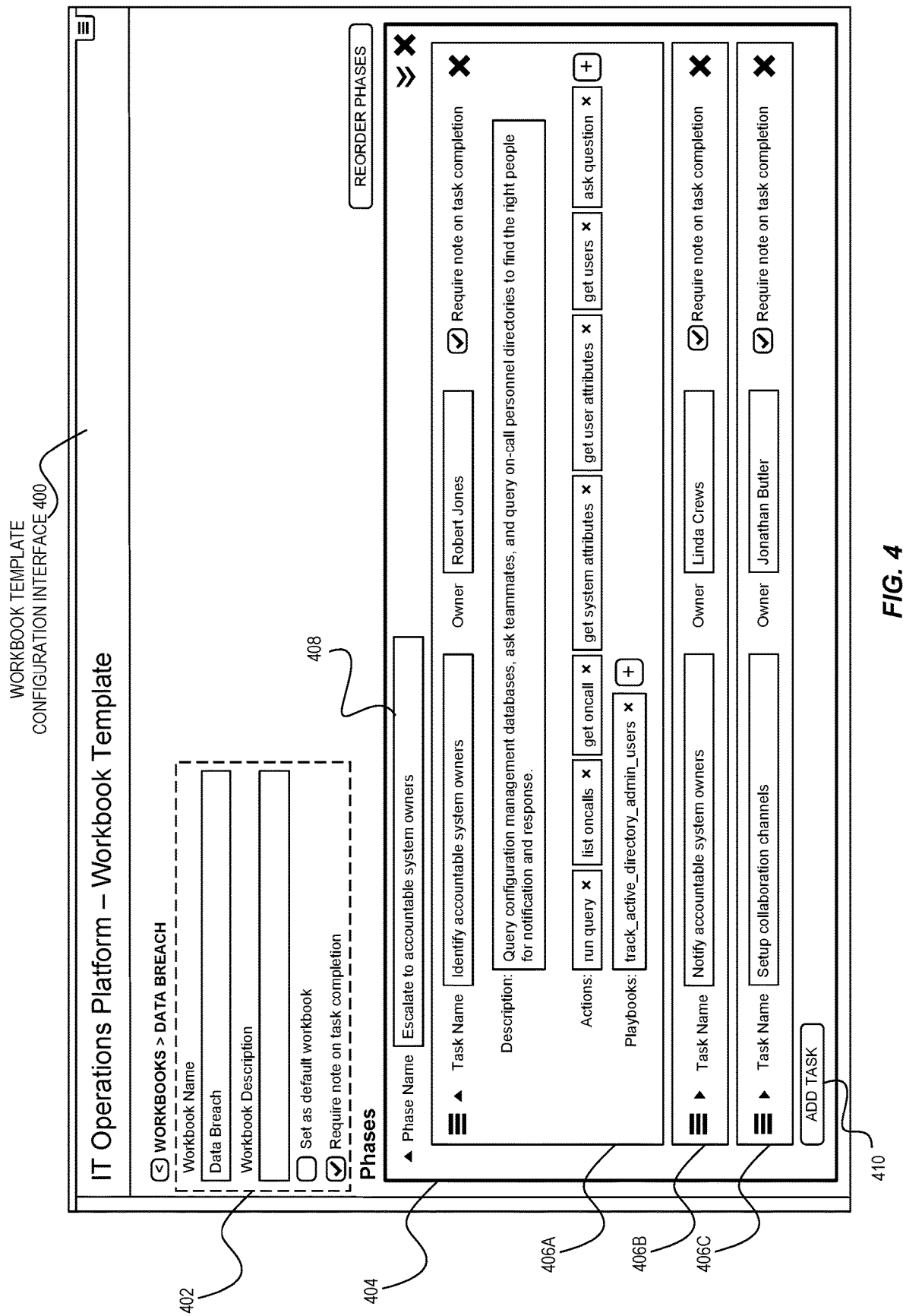
FIG. 4 illustrates an example workbook template configuration interface used to create a workbook according to some embodiments.

As indicated above, an IT operations platform 102 may include various GUIs that can be used to define workbook templates and to interact with workbook instances. FIG. 4 illustrates an example workbook template configuration interface used to create a workbook template according to some embodiments. As illustrated in FIG. 4, a workbook template configuration interface 400 includes interface elements for specifying information about a workbook template generally, and additional interface elements used to define the phases and tasks associated with the workbook.

In some embodiments, the workbook template configuration interface 400 includes a set of workbook information options 402, including fields for entry of a workbook name and workbook description, an interface element that can be used to set the current workbook as a default workbook, and an interface element that can be used to designate whether users are required to create a note upon completion of workbook tasks. In some embodiments, the workbook template configuration interface 400 further includes a phases definition panel 404. The example shown in FIG. 4 illustrates the definition of a single phase; however, a workbook template generally can include any number of separate phases as desired by the user. As illustrated in FIG. 4, the phases panel 404 include a field 408 for entry of a phase name and an add task button 410 used to add tasks to the phase. In FIG. 4, an example "Data Breach" workbook template includes a phase named "Escalate to accountable system owners." The phase named "Escalate to accountable system owners" includes three tasks: a task 406A named "Identify accountable system owners," a task 406B named "Notify accountable system owners," and a task 406C named "Setup collaboration channels." Each of the tasks 406A-406C includes fields for the task name and the owner (e.g., a user who can be designated as being responsible for the associated task), and a selector button to designate that a notification should be sent upon completion of the task. In response to selecting a specific task within a phase, the workbook editor displays additional options for the corresponding task. As illustrated in FIG. 4, selected task 406A includes a field for entry of text for a description of the task, in addition to options to add or remove executable actions and playbooks. The set of executable actions 408 associated with task 406A includes the track active directory admin users playbook, as well as individual actions, including run query, list oncalls, get oncall, get system attributes, get user attributes, get users, and ask question.

Figure 5:
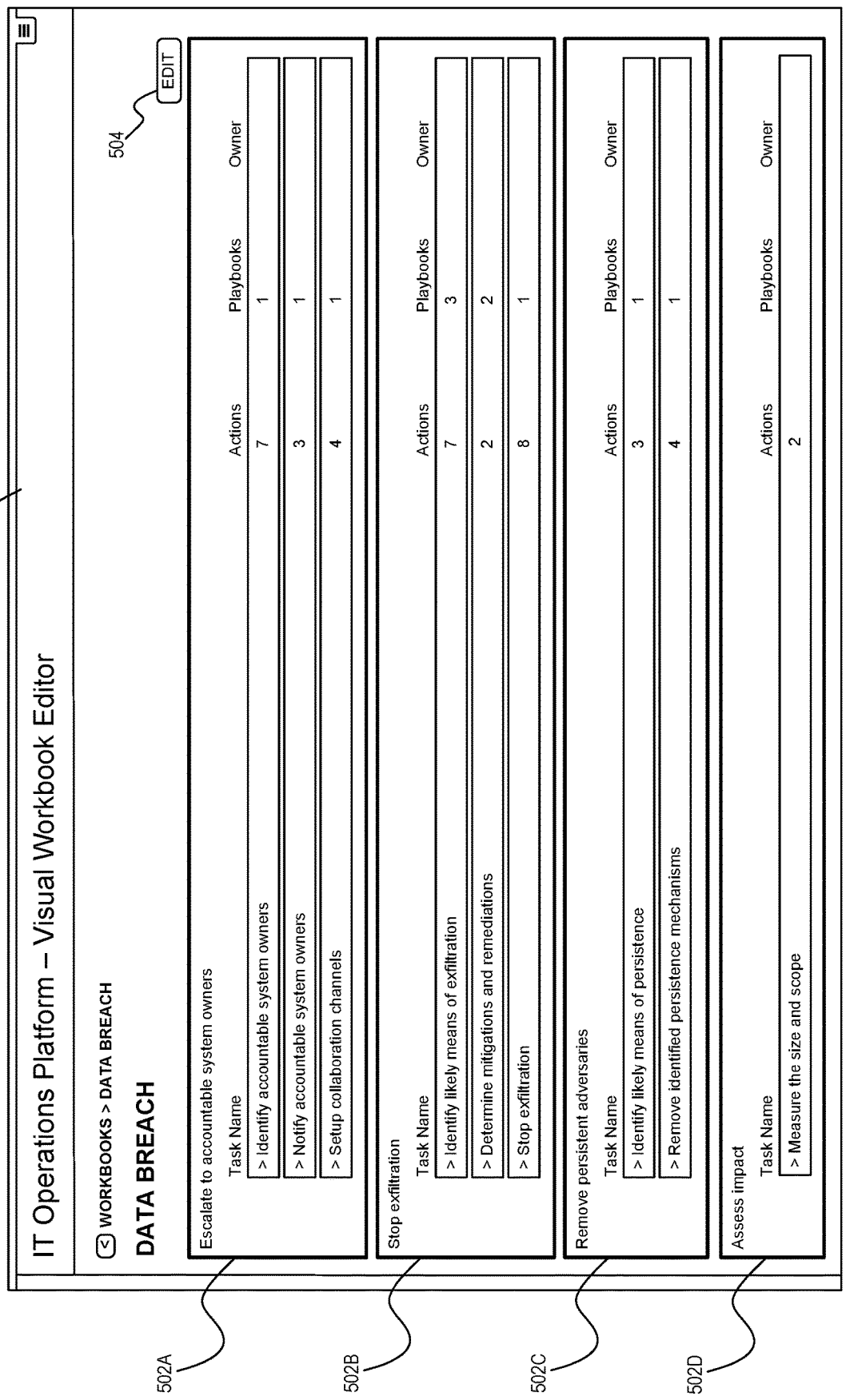
FIG. 5 illustrates an example workbook template review interface displaying information about a defined workbook template according to some embodiments.

FIG. 5 illustrates an example workbook template review interface displaying information related to a defined workbook template according to some embodiments. For example, as illustrated in the workbook template review interface 500 shown in FIG. 5, the phases of a created "Data Breach" workbook template include: a phase 502A labeled "Escalate to accountable system owners," a phase 502B labeled "Stop the exfiltration," a phase 502C labeled "Remove persistent adversaries," and a phase 502D labeled "Assess impact." Additional phases not pictured can include, for example, phases labeled "Report to appropriate stakeholders" and "Prevent future breaches." As illustrated in FIG. 5, the tasks associated with the phase 502B include: "Identify likely means of exfiltration," "Determine mitigations and remediations," and "Stop exfiltration"; the tasks associated with phase 502C include: "Identify likely means of persistence" and "Removed identified persistence mechanisms"; and the task for phase 502D include: "Measure the size and scope." The workbook template review interface 500 further displays, for each task, an indication of a number of actions and playbooks associated with the task, as well as an owner of the task, if any. A user can select an edit button 504 to further configure the workbook template, if desired.

3.0. Functional Overview

IT operations platforms, such as the IT operations platform 102 described herein, can be used for a variety of orchestration, automation, and response tasks related to IT environments. One way in which such a platform can be used is to help analysts and other users identify and investigate incidents that may occur from time to time in IT environments. During the course of such incident investigations, analysts typically collect and review various types of data related an incident and may often identify certain associated data objects (e.g., files, usernames, IP addresses, or entire events) as being particularly relevant to the investigation. Analysts may attempt to set aside and use the identified data to further the investigation in various ways (for example, by obtaining additional information about an identified IP address, by determining whether an identified file is known to be malicious, and the like). However, existing IT operations platforms generally lack a standardized way for analysts and other users to identify such data items within the platform and in related systems. Furthermore, the manual identification of data items in this manner presents challenges for analysts desiring to share such information across analyst teams and fails to capitalize on the many ways in which an IT operations platform 102 can automate actions relative to identified data items.

3.1. Evidence Overview

According to embodiments described herein, an IT operations platform 102 enables analysts and other users working to investigate, resolve, and document IT incidents to readily identify certain data objects (for example, events, event artifacts, files, notes, actions results, and so forth) as "evidence" within the platform when such data objects are believed to be of particular significance to an investigation or other matter. For example, an investigation related to a security-related incident might be associated with many data events generated based on data ingested by an IT operations platform 102 from a separate security application. In this example, one or more of the events might include various artifacts such as an asset identifier, a hash value of a suspected malicious file, a file path on an infected endpoint, one or more IP addresses, and the like. According to some embodiments, an analyst can now use various interfaces of an IT operations platform 102 to indicate which of such events, event artifacts, or other data objects represents evidence in the context of an investigation or other matter that the analyst is conducting.

In some embodiments, once a data object is identified as evidence, an IT operations platform 102 can visually highlight representations of the identified data object across the platform as an item of evidence. This visual indication, for example, can help influence analysts and other users with various decision making and other processes when reviewing investigations with which the evidence is linked. For example, if an analyst identifies an IP address associated with an event as evidence, the same event and any other event in the IT operations platform 102 that is associated with the same IP address can be displayed with an indication of its status as evidence. Analysts and other users can then take that indication into account, for example, when deciding if certain items of data related to an investigation merit further investigation, analysis, and reporting.

In some embodiments, an IT operations platform 102 can further perform various types of automated actions in response to a user identifying a data object as an evidence. These automated actions can include actions taken within the IT operations platform such as, for example, limiting users' access to data objects identified as evidence, changing permissions to modify or delete the data objects, modifying data retention policies associated the data objects, notifying owner(s) of affected assets related to the evidence (for example, to indicate that an asset is part of an ongoing security investigation and that owner should avoid tampering or altering the state of the asset, and so forth), and updating a sensitivity level associated with the data object. The automated actions may further include actions used to contextualize the identified data object such as, for example, automatically obtaining enrichment data using internal or external data sources such reputation lookups, threat feeds, configuration management database (CMDB) systems, identity stores, and so forth, generating reports including information related to the identified data object, and the like. In some embodiments, actions such as those described above and others can be performed based on execution of one or more playbooks defined in the IT operations platform 102. Additionally or alternatively, such actions/playbooks can be suggested to users for on-demand execution.

In some embodiments, an IT operations platform further can automatically perform various actions and analyses to identify other data objects related to a data object marked as evidence. For example, if a data object including an endpoint device identifier is identified as evidence, the IT operations platform can perform searches for other related data objects (for example, data objects representing other network devices that the endpoint device has recently communicated with, users associated with the endpoint device, files identified on the endpoint device, and so forth). The related data objects can be identified based on being associated with timestamps in a common time range, based on common identifiers, or any other types of analyses or combinations thereof. The ability to identify other data objects related to item of evidence, for example, can help analysts efficiently compile a more complete body of evidence associated with an identified incident. Similar types of evidence gathering tasks are often performed manually by analysts as part of investigations and, thus, automation of such activities by an IT operations platform 102 can help analysts achieve higher levels of efficiencies in their operations.

In some embodiments, at least some of the described processes related to evidence identification relate particularly to the use of workbooks, as described above in Section 2.6. For example, many SOPs such as NIST 800-53 include a defined evidence gathering phase. In these evidence gathering phases, analysts typically seek to identify attributes of an incident and conduct further research based on those identified attributes to learn more about the incident. Once an attribute has been identified as evidence, there are many actions that typically follow such as, for example, access control to the attributes, and the like. In existing systems, these processes are largely manual and often error-prone. According to embodiments described herein, an IT operations platform 102 can automatically perform many different types actions that are expected of analysts once an item of information is identified as evidence.

3.2. Identifying Data Objects as Evidence

In some embodiments, an IT operations platform 102 includes various "mission control" interfaces where analysts and other users can manage IT operations events and investigations, as described above. At a high level, a mission control interface brings together many different features of the IT operations platform 102, including a place to view security event data, enabling users to easily interact with a variety of tools, data, and collaboration tools in a single view. Such interfaces thus represent a common place where analysts might identify data objects as evidence, for example, as part of various incident investigative tasks (although an IT operations platform 102 may generally support evidence identification at any number of different interfaces). For a particular case or investigation, a mission control interface typically displays various data objects associated with the case including events, files, action results, notes, and the like.

Figure 6:
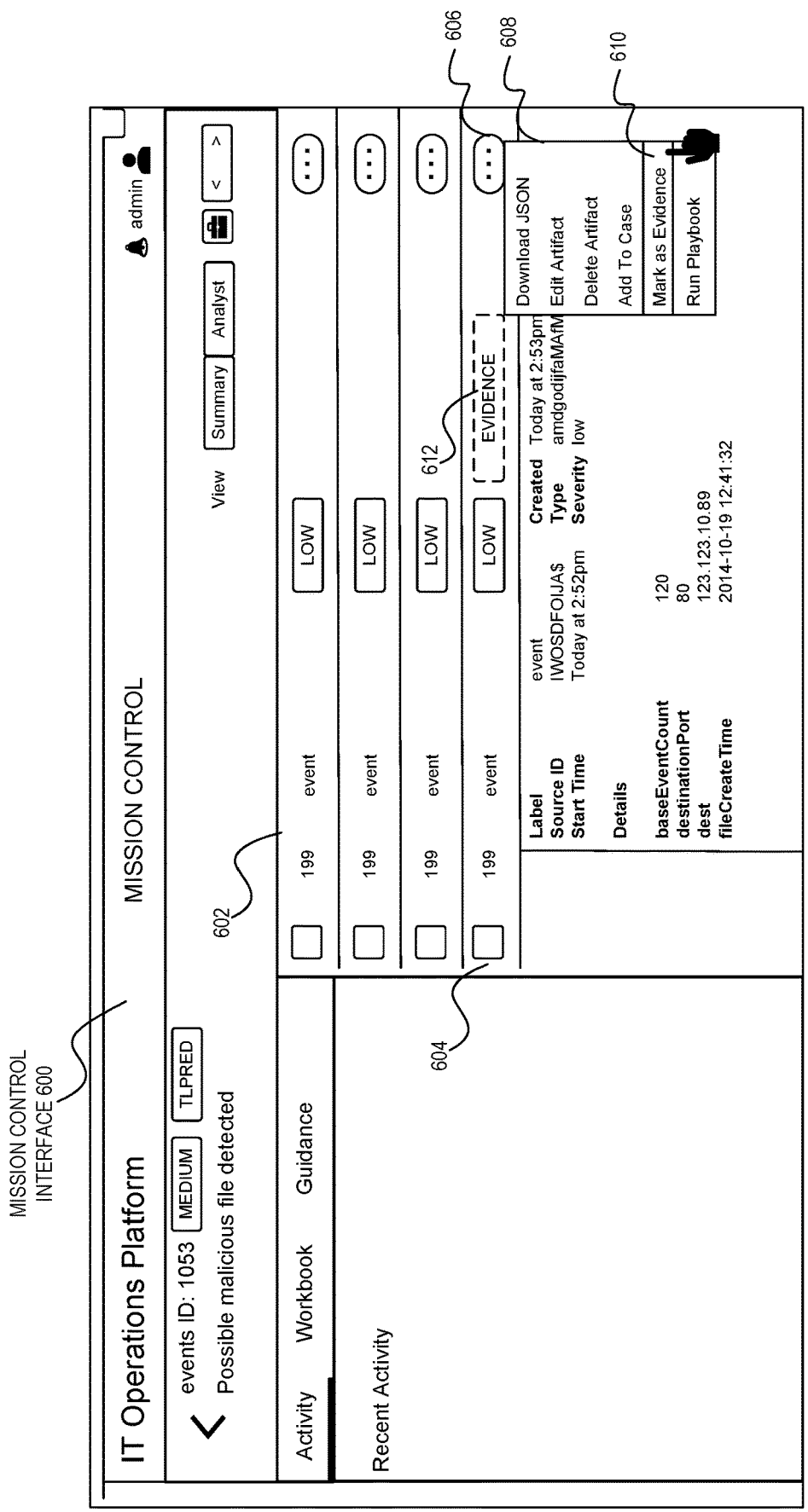
FIG. 6 illustrates an example mission control interface provided by an IT operations platform at which data objects can be identified as evidence according to some embodiments.

FIG. 6 illustrates an example mission control interface displaying data associated with a case or investigation. In the example of FIG. 6, the mission control interface 600 includes an event list 602 associated with an investigation, and is further currently shown displaying detailed information associated with an example event 604. A user, for example, may have previously provided input selecting the event 604 in the interface 600 so that the more detailed information display is presented.

In an embodiment, the mission control interface 600 includes interface elements (for example, interface element 606) displayed in association with events that enable a user to select actions to perform with respect to a corresponding event. In response to selection of the interface element 606, the mission control interface 600 displays an action menu such as action menu 608. The example action menu 608, for example, includes various action options such as downloading the event data as JSON-formatted data, editing the event, deleting the event, adding the event to a case, or running a playbook. According to embodiments described herein, an action menu 608 further includes an action option 610 to mark the data object (in this example, event 604) as evidence. Although the example shown in FIG. 6 illustrates a user marking an event as evidence, similar processes can be used to mark one or more particular artifacts associated with an event as evidence (for example, a username, asset identifier, IP address, or other artifact associated with an event) or possibly other types of data managed by the IT operations platform 102.

In some embodiments, once a data object is identified as evidence, the IT operations platform 102 displays instances of the data object using a visual representation that indicates its status as an item of evidence. Referring to FIG. 6, for example, display of the event 604 may include an evidence tag icon 612 once the event has been marked as evidence. In some embodiments, other types of icons, graphics, colors, fonts, font styles, or combinations thereof, can be used to indicate that a data object has been marked as evidence. The visual indication of a data object (for example, an event or event artifact) as evidence can be displayed within a same interface at which the data object was marked as evidence (for example, as illustrated in FIG. 6), as well as other interfaces at which the data object may appear (for example, in other interfaces displaying events outside the context of a particular investigation, interfaces displaying information about other investigations with which the same event or event artifact is associated, and so forth).

Figure 7:
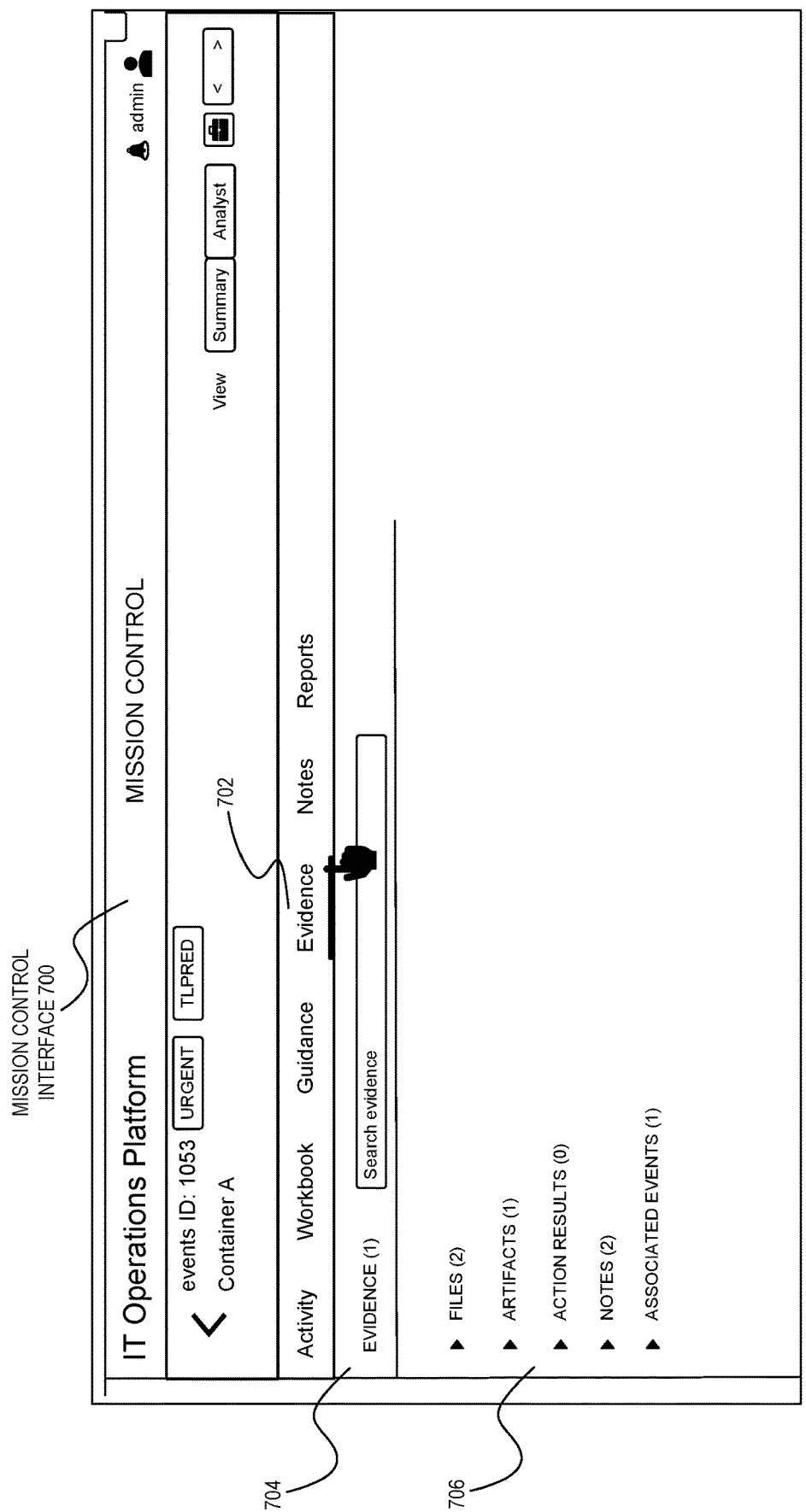
FIG. 7 illustrates an example mission control interface provided by an IT operations platform including a display of evidence groupings according to some embodiments.

In some embodiments, the IT operations platform 102 includes an evidence-specific interface that displays one or more data objects identified as evidence in a single interface. The items of evidence displayed, for example, may relate to a particular case or investigation managed by the IT operations platform 102. FIG. 7 illustrates an example of an interface including an evidence panel that can be used to display various types of data objects marked as evidence. As illustrated, the mission control interface 700 includes an evidence tab 702, which causes display of an evidence panel 704. The evidence panel 704 includes several groupings of evidence 706, where each grouping corresponds to a different type of data object that can be identified as evidence. In the example shown in FIG. 7, the example groupings include files, artifacts (for example, including events or event artifacts), action results, notes, and associated events. In other embodiments, the groupings of evidence can be based on different data type categories, or the set of evidence can be displayed using different display formats (for example, displayed in a single list, as a tiled display, and so forth).

Figure 8:
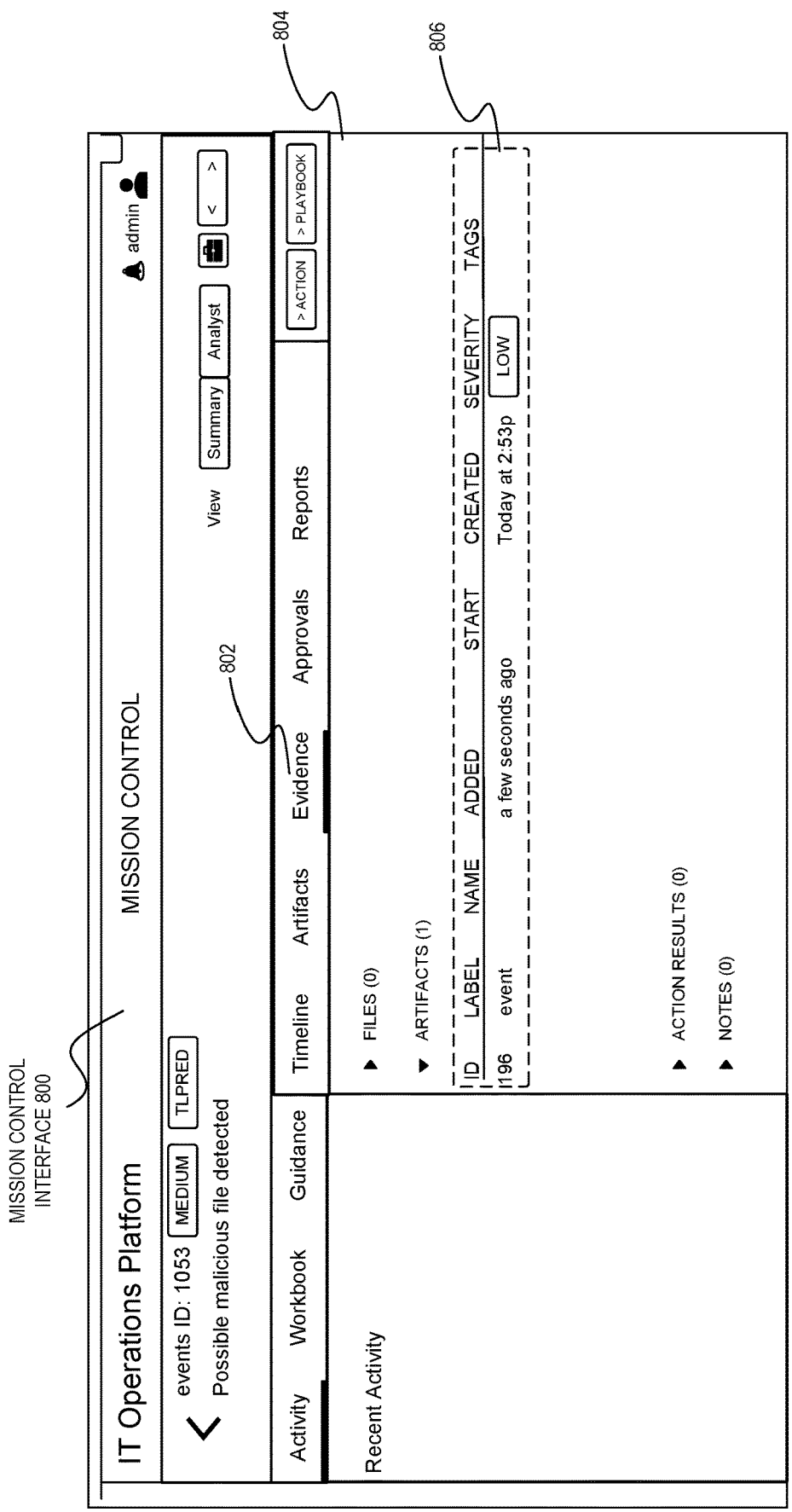
FIG. 8 illustrates an example mission control interface provided by an IT operations platform including displaying information about an event marked as evidence according to some embodiments.

FIG. 8 illustrates an example mission control interface 800 similar to the mission control interface 700, where a data object identified as evidence is displayed. As shown in FIG. 8, selection of an evidence tab 802 causes display of an evidence panel 804 with groupings of data objects marked as evidence. In this example of FIG. 8, a single artifact data object 806 is shown as part of the artifacts evidence grouping. In an embodiment, various information associated with the evidence can be displayed such as a data object id, a label, a name of the data object, indications of when the data object was created, added as evidence, a severity level associated with the data object, associated tags, and so forth. Although only a single item of evidence is shown in the example of FIG. 8, any number of data objects may be displayed in the interface 800 depending on how many have been marked as evidence.

3.3. Automated Evidence Operations

Figure 9:
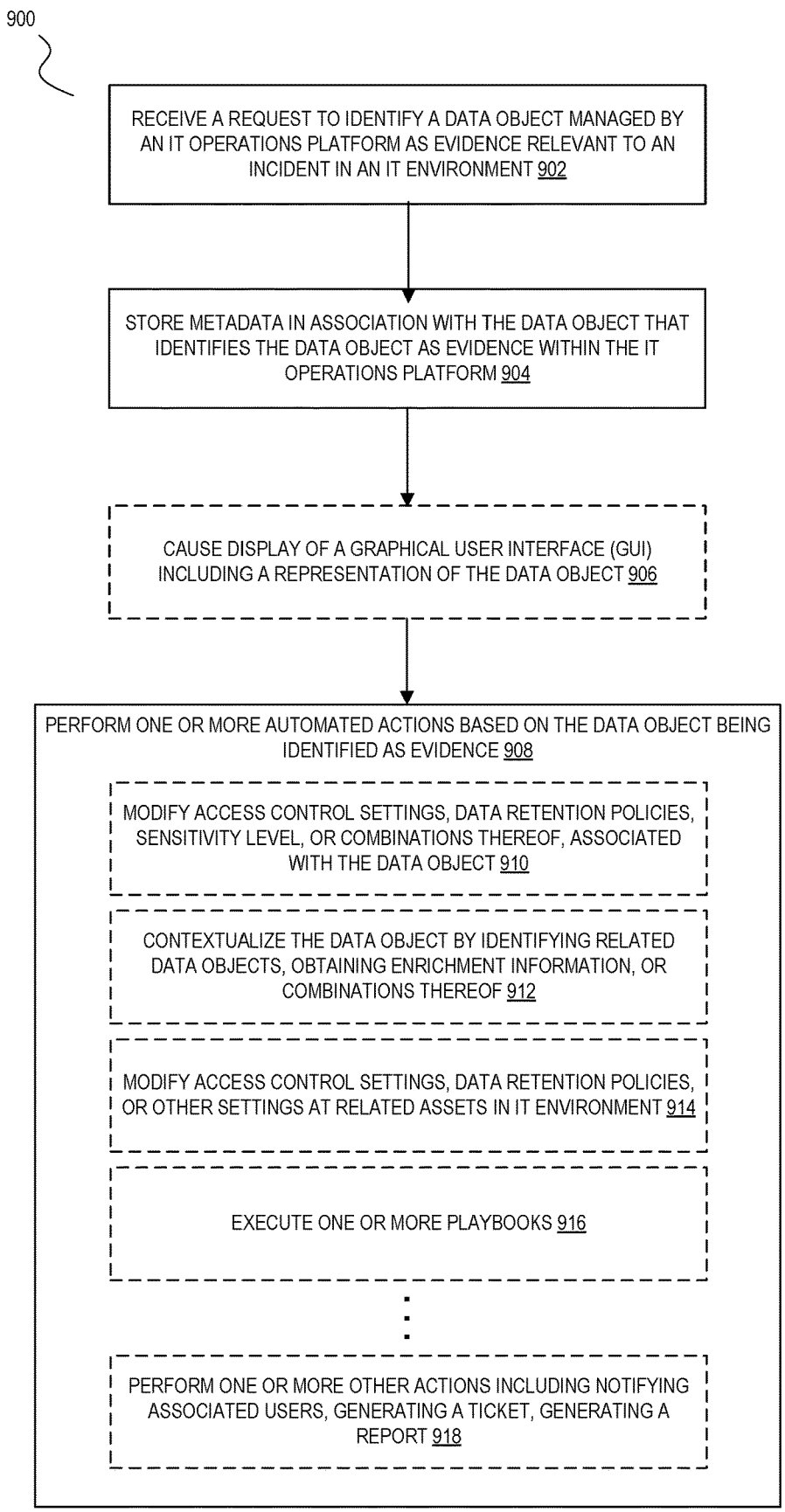
FIG. 9 is a flow diagram illustrating operations of a method for performing various actions in response to receiving a request to mark a data object managed by an IT operations platform as evidence, according to some embodiments.

As indicated above, in response to a data object being marked as evidence, an IT operations platform 102 can perform various types of automated actions. FIG. 9 is a flow diagram illustrating operations 900 of a method for performing various actions in response to receiving a request to mark a data object managed by an IT operations platform as evidence, according to some embodiments. Some or all of the operations 900 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by an IT operations platform 102 of the other figures.

The operations 900 include, at block 902, receiving a request to identify a data object managed by an IT operations platform as evidence related to an incident in an IT environment, the data object representing an event or an artifact of an event associated with the incident. As illustrated with respect to FIG. 6, for example, a user can generate a request to identify a data object (for example, an event, an event artifact, or any other data item managed by the IT operations platform) as evidence by selecting an interface element (for example, a menu option) displayed in association with a representation of the data object in a GUI of the IT operations platform and indicating the user's desire to mark the data object as evidence. In other embodiments, such a request can be generated programmatically (for example, via an API) or using any other interface associated with the IT operations platform 102 (for example, via a desktop application, command line interface (CLI), and the like).

The operations 900 further include, at block 904, storing metadata in association with the data object that identifies the data object as evidence within the IT operations platform. In some embodiments, the metadata stored in association with the object can include a type of tag or property value associated the data object. For example, if the data object is an event, an "evidence" tag can be stored in association with the event data, or an evidence field associated with the data object can be associated with a particular value indicating its status, or using other types of metadata. Similar data can be stored in association with particular event artifacts or other types of data objects that can be marked as evidence in the platform. In this manner, if a data object is marked as evidence with respect to one event or investigation, the data object's status as evidence can also be determined if the data object is also associated with other investigations or events (either already stored in the platform or subsequently generated by the platform). For example, if a data object representing an IP address, username, asset identifier, or other artifact is marked as evidence, occurrences of the same IP address, username, asset identifier, etc., in other events can be automatically marked as evidence by the platform.

The operations 900 optionally include, at block 906, causing display of a GUI that includes a graphical representation of data object, where the graphical representation visually identifies the data object as evidence. Referring again to FIG. 6, for example, once the event 604 is marked as evidence in response to the user selecting the menu option 610, the event 604 can be visually displayed in the interface 600 (and in any other interface of the IT operations platform 102) in such a way that its status as evidence is apparent to users. For example, the graphical representation of the event may be displayed using an evidence icon or graphic, using a different color, font, or font style, or any combination thereof.

The operations 900 include, at block 908, performing one or more automated actions based on the data object being identified as evidence. Blocks 910-918 describe example types of automated actions that can be performed by an IT operations platform 102 in response to a data object being identified as evidence, according to various embodiments, although any action supported by the platform 102 is possible.

In some embodiments, at block 910, in response to a data object being identified as evidence, the IT operations platform 102 can execute various actions to modify access control settings, data retention policies or settings, a sensitivity level, or combinations thereof, associated with the data object. For example, in response to a data object being marked as evidence, an IT operations platform 102 can automatically limit which users can view, modify, and/or delete the data object within the platform.

As another example, the IT operations platform 102 can automatically increase a sensitivity level associated with a data object identified as evidence (for example, automatically increase the sensitivity level by a set number of levels, or automatically associate it with a particular sensitivity level). For example, the sensitivity level can correspond to a Traffic Light Protocol (TLP) or other protocol dictating how information is shared among multiple departments and across organizations.

In some embodiments, in response to data object being identified as evidence, the IT operations platform 102 can modify data retention settings or policies associated with the data object. For example, the IT operations platform 102 can modify the associated data retention settings such that a data object marked as evidence is retained by the platform for a duration that is longer than if the data object was not marked as evidence. Restrictions such as those described above, for example, can help ensure that the data object is protected from inadvertent or intentional deletion, modification, or leaking and that its evidentiary value is preserved.

In some embodiments, the operations 900 further optionally include, at block 912, contextualizing the data object by identifying related data objects, obtaining enrichment information from internal or external data sources, or combinations thereof. For example, as part of an evidence gathering process associated with a workbook, an analyst might typically be required to perform various searches using link analysis and other techniques if a data object has been identified as evidence (for example, to find out what other actions a user that has been identified as evidence has taken within a 24 hour time period, or what other IP addresses an IP address identified as evidence has communicated with, and so forth). In some embodiments, depending on a type of data object identified as evidence, one or more much actions can be performed to identify other relevant data objects. In some embodiments, the related data objects can also be identified as evidence, possibly depending on whether the identified data objects meet certain defined criteria.

In some embodiments, once data object has been identified as evidence, the IT operations platform 102 searches for other existing events or investigations that that include the same data object and automatically mark such events or investigations as evidence. In some embodiments, the IT operations platform 102 can also identify future events or investigations that include the same object and automatically mark such future data objects as evidence. For example, if an IP address is marked as evidence in a current event, and a subsequently received event includes the same IP address, the subsequently received event or occurrence of the IP address in the event can be automatically marked as evidence.

In some embodiments, the identification of data objects related to a data object marked as evidence can include identifying mutated versions of a data object. In this context of malware, for example, the filename and other attributes associated with the malware may often be mutated in an automated fashion as the malware spreads in an attempt to avoid easy detection. In some embodiments, if a data object known to be malware or the like is identified as evidence, the IT operations platform 102 can perform various actions to identify subsequent occurrences of the same data object or mutated version of the data object based on various analysis techniques.

In some embodiments, access control settings, data retention settings, sensitivity levels, and other settings described above with respect to data objects marked as evidence can also be automatically configured with respect to related data objects by the IT operations platform 102. For example, if an IT operations platform 102 modifies one or more data retention settings associated with a data object marked as evidence, the platform may also automatically apply the same or similar data retention settings to any identified related data objects, possibly depending on how related the data objects are.

In some embodiments, the operations 900 further optionally include, at block 914, modifying access control settings, data retention policies, or other settings at related assets within an IT environment in response to identification of a data object as evidence. For example, in addition to modifying such settings with respect to data objects managed by the IT operations platform 102, related assets and applications in an IT environment can be locked down to preserve evidence that may be useful for reporting and forensics. For example, in response to a user marking a data object as evidence, the IT operations platform 102 may perform one or more actions to modify access controls, data retention policies, or other settings with respect to related data at a CMDB system, data stored at one or more endpoint devices or other network devices, data stored by one or more external security applications, and the like.

In some embodiments, at block 916, the operations further optionally include executing one or more playbooks in response to an item of information being identified as evidence. For example, a playbook can be created to perform a series of actions related to a data object that is marked as evidence (for example, if the data object is an IP address, a playbook can be executed to obtain a reputation score for the IP and if the reputation is above a threshold to quarantine associated endpoint devices, or if the data object is a file, a playbook can be executed to determine whether the file is known malware and if so to remove the file from the affected devices, and so forth). In some embodiments, any combination of playbooks and standalone actions can be performed in response to identification of a data object as evidence and possibly depending on the type of data object.

In some embodiments, the operations 900 further optionally include, at block 918, performing one or more other actions such as, for example, notifying one or more associated users (for example, sending an email or generating a notification in the platform 102), generating a ticket, generating a report (for example, a report including information about the investigation as a whole with particular callouts for items of information identified as evidence), and so forth. In general, any type of automated action supported by the platform 102 can be performed with respect to data objects identified as evidence depending on configuration of the platform.

In some embodiments, in response to a user identifying a data object as evidence, any one or more of the actions or playbooks described above can be suggested to the user for execution as desired. For example, once a data object has been identified as evidence, the IT operations platform 102 can cause display of icons or other graphical representations of possible actions/playbooks that can be selected by a user for execution on-demand. The possible actions/playbooks displayed in association with a data object can be identified by the IT operations platform 102 based on the type of data represented by the data object. For example, if data object identified as evidence corresponds to an IP address, the set of suggested actions/playbooks can include operations typically performed on IP addresses such as, for example, reputation score lookups, blacklist/whitelist lookups, etc. In some embodiments, the set of suggested actions/playbooks displayed can be based on historical data reflecting whether previous executions of the actions were successful or not.

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 10:
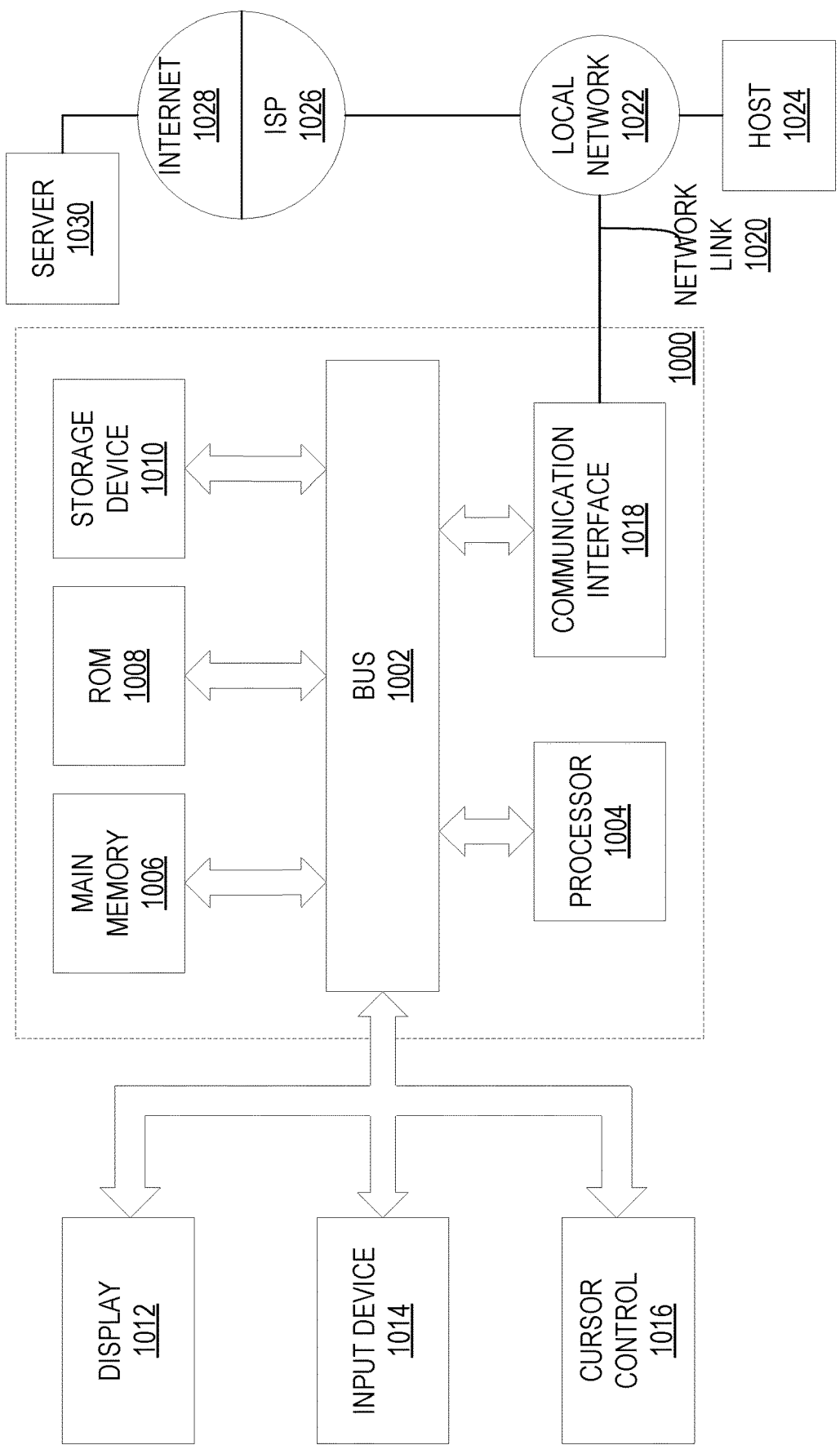
FIG. 10 is a block diagram illustrating a computer system utilized in implementing the techniques described herein according to some embodiments.

FIG. 10 is a block diagram that illustrates a computer system 1000 utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device.

Computer system 1000 includes one or more buses 1002 or other communication mechanism for communicating information, and one or more hardware processors 1004 coupled with buses 1002 for processing information. Hardware processors 1004 may be, for example, general purpose microprocessors. Buses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes a main memory 1006, such as a random access memory (RAM) or other dynamic or volatile storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 a special-purpose machine that is customized to perform the operations specified in the instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, is provided and coupled to bus 1002 for storing information and instructions.

Computer system 1000 may be coupled via bus 1002 to one or more displays 1012 for presenting information to a computer user. For instance, computer system 1000 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via network routers and/or switches on a Local Area Network (LAN) or other suitable shared network, or via a peer-to-peer network, from the input device 1014 to a network link 1020 on the computer system 1000.

A computer system 1000 may implement techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 802.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world-wide packet data communication network now commonly referred to as the "internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In an embodiment, some or all of the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by an information technology (IT) operations platform, the method comprising:
   receiving a request to identify a first data object managed by the IT operations platform as evidence relevant to an incident in an IT environment, the first data object representing an event or an artifact of an event associated with the incident;
   storing metadata in association with the first data object that identifies the first data object as evidence within the IT operations platform;
   modifying permissions associated with the first data object based on the request to identify the first data object as evidence relevant to the incident in the IT environment; and
   in response to the request to identify the first data object as evidence,
   automatically executing a search using the metadata associated with the first data object to identify a second data object managed by the IT operations platform that is related to the first data object but is not identified as evidence relevant to the incident,
   identifying the second data object as evidence relevant to the incident, and
   modifying permissions associated with the second data object to restrict the ability for the second data object to be modified or deleted.

2. The computer-implemented method of claim 1, further comprising automatically modifying a data retention policy associated with the first data object based on the request to identify the first data object as evidence.

3. The computer-implemented method of claim 1, wherein the data object is a first data object, and wherein the method further comprises comprising modifying a data retention policy associated with the second data object that is related to the first data object.

4. The computer-implemented method of claim 1, further comprising automatically performing an action that causes an asset in the IT environment to modify, based on the request to identify the first data object as evidence, permissions associated with data at the asset related to the first data object.

5. The computer-implemented method of claim 1, further comprising automatically obtaining enrichment data associated with the first data object based on the request to identify the first data object as evidence relevant to the incident in the IT environment.

6. The computer-implemented method of claim 1, further comprising generating a notification for a user associated with the first data object.

7. The computer-implemented method of claim 1, further comprising automatically updating a sensitivity level associated with the first data object.

8. The computer-implemented method of claim 1, wherein the first data object includes an Internet Protocol (IP) address, and wherein the method further comprises obtaining a reputation score for the IP address from a reputation lookup.

9. The computer-implemented method of claim 1, further comprising automatically executing a playbook based on the request to identify the first data object as evidence relevant to the incident in the IT environment.

10. The computer-implemented method of claim 1, further comprising automatically performing a type of action based on the request to identify the first data object as evidence relevant to the incident in the IT environment, wherein the type of action is determined based on a type of data represented by the first data object, and wherein the type of data is one of: an event, a file, an Internet Protocol (IP) address, an action result, or an asset identifier.

11. The computer-implemented method of claim 1, further comprising causing display of a graphical user interface (GUI) including one or more interface elements representing the first data object, wherein the one or more interface elements include at least one interface element indicating that the first data object is evidence.

12. The computer-implemented method of claim 1, wherein the incident is a first incident, and wherein the first data object is further associated with a second incident in the IT environment, the method further comprising causing display of a graphical user interface (GUI) related to the second incident in the IT environment, wherein the GUI includes at least one interface element indicating that the first data object is evidence.

13. The computer-implemented method of claim 1, wherein the incident in the IT environment is a first incident, the method further comprising:
   identifying a second incident in the IT environment;
   determining that the second incident is associated with the first data object; and
   storing metadata in association with the second incident that identifies the first data object as evidence relevant to the second incident.

14. The computer-implemented method of claim 1, wherein the data object is a first data object and the metadata is first metadata, and wherein the method further comprises comprising storing second metadata in association with the second data object that identifies the second data object as evidence within the IT operations platform, wherein the second data object is identified based on one or more of: the second data object being associated with a user associated with the first data object, the second data object being associated with a timeframe relative to the first data object, the second data object being associated with an Internet Protocol (IP) address related to the first data object, or the second data object being associated with an asset related to the first data object.

15. The computer-implemented method of claim 1, wherein the first data object includes one or more of: a file, an Internet Protocol (IP) address, an event, an action result.

16. The computer-implemented method of claim 1, wherein the request is received via a graphical user interface (GUI) displaying information related to the incident in the IT environment.

17. The computer-implemented method of claim 1, further comprising generating a report related to the incident in the IT environment, the report including an indication of identification of the first data object as evidence.

18. The computer-implemented method of claim 1, wherein the metadata is a tag stored in association with the first data object.

19. A non-transitory computer-readable storage medium storing instructions which, when executed by one or more processors, cause performance of operations comprising:
receiving a request to identify a first data object managed by an IT operations platform as evidence relevant to an incident in an IT environment, the first data object representing an event or an artifact of an event associated with the incident;
storing metadata in association with the first data object that identifies the first data object as evidence within the IT operations platform;
modifying permissions associated with the first data object based on the request to identify the first data object as evidence relevant to the incident in the IT environment; and
in response to the request to identify the first data object as evidence,
automatically executing a search using the metadata associated with the first data object to identify a second data object managed by the IT operations platform that is related to the first data object but is not identified as evidence relevant to the incident, identifying the second data object as evidence relevant to the incident, and
modifying permissions associated with the second data object to restrict the ability for the second data object to be modified or deleted.

20. The non-transitory computer-readable storage medium of claim 19, wherein the instructions, when executed by the one or more processors, further cause performance of operations comprising automatically modifying a data retention policy associated with the first data object based on the request to identify the first data object as evidence.

21. The non-transitory computer-readable storage medium of claim 19, wherein the data object is a first data object, and wherein the instructions, when executed by the one or more processors, further cause performance of operations comprising automatically modifying a data retention policy associated with the second data object that is related to the first data object.

22. The non-transitory computer-readable storage medium of claim 19, wherein the instructions, when executed by the one or more processors, further cause performance of operations comprising automatically performing an action that causes an asset in the IT environment to modify, based on the request to identify the first data object as evidence, permissions associated with data at the asset related to the first data object.

23. The non-transitory computer-readable storage medium of claim 19, wherein the instructions, when executed by the one or more processors, further cause performance of operations comprising automatically obtaining enrichment data associated with the first data object based on the request to identify the first data object as evidence relevant to the incident in the IT environment.

24. An apparatus, comprising:
one or more processors; and
a non-transitory computer-readable storage medium storing instructions which, when executed by the one or more processors, causes the apparatus to:
identify an occurrence of a type of incident in an IT environment;
receive a request to identify a first data object managed by an IT operations platform as evidence relevant to an incident in an IT environment, the first data object representing an event or an artifact of an event associated with the incident;
store metadata in association with the first data object that identifies the first data object as evidence within the IT operations platform;
modify permissions associated with the first data object based on the request to identify the first data object as evidence relevant to the incident in the IT environment; and
in response to the request to identify the first data object as evidence,
automatically execute a search using the metadata associated with the first data object to identify a second data object managed by the IT operations platform that is related to the first data object but is not identified as evidence relevant to the incident,
identify the second data object as evidence relevant to the incident, and
modify permissions associated with the second data object to restrict the ability for the second data object to be modified or deleted.

25. The apparatus of claim 24, wherein the instructions comprise further instructions that, when executed by the one or more processors, further cause the apparatus to automatically modify a data retention policy associated with the first data object based on the request to identify the first data object as evidence.

26. The apparatus of claim 24, wherein the data object is a first data object, and wherein the instructions comprise further instructions that, when executed by the one or more processors, further cause the apparatus to automatically modify a data retention policy associated with the second data object that is related to the first data object.

27. The apparatus of claim 24, wherein the instructions comprise further instructions that, when executed by the one or more processors, further cause the apparatus to automatically perform an action that causes an asset in the IT environment to modify, based on the request to identify the first data object as evidence, permissions associated with data at the asset related to the first data object.

* * * * *